US009356895B2

(12) United States Patent
Chiu (10) Patent No.: US 9,356,895 B2
(45) Date of Patent: May 31, 2016

(54) MESSAGE TRANSMISSION SYSTEM AND METHOD FOR A STRUCTURE OF A PLURALITY OF ORGANIZATIONS

(71) Applicant: MITAKE INFORMATION CORPORATION, Taipei (TW)

(72) Inventor: Hung-Che Chiu, Taipei (TW)

(73) Assignee: MITAKE INFORMATION CORPORATION, Taipei (TW)

( * ) Notice: Subject to any disclaimer, the term of this patent is extended or adjusted under 35 U.S.C. 154(b) by 0 days.

(21) Appl. No.: 14/699,788

(22) Filed: Apr. 29, 2015

(65) Prior Publication Data

US 2015/0326512 A1 Nov. 12, 2015

Related U.S. Application Data

(63) Continuation-in-part of application No. 14/456,143, filed on Aug. 11, 2014.

(30) Foreign Application Priority Data

May 7, 2014 (TW) .............................. 103116325 A
Feb. 6, 2015 (TW) .............................. 104104173 A (51) Int. Cl.
*H04M 1/66* (2006.01)
*H04L 12/58* (2006.01)
(Continued)

(52) U.S. Cl.
CPC ........ *H04L 51/046* (2013.01); *G06F 17/30876* (2013.01); *G06Q 10/107* (2013.01); *H04L 51/24* (2013.01); *H04L 63/083* (2013.01); *H04L 63/0823* (2013.01); *H04L 67/26* (2013.01); *H04M 1/72552* (2013.01); *H04W 4/12* (2013.01); *H04W 12/06* (2013.01)

(58) Field of Classification Search
CPC ....... H04L 51/046; H04L 67/26; H04L 51/24; H04L 63/083; H04L 63/0823; H04W 4/12; H04W 12/06; G06F 17/30876; G06Q 10/107; H04M 1/72552
USPC ........... 455/15, 405, 406, 412, 418, 419, 436, 455/446, 517, 466, 423, 438, 41.1, 456.1, 455/412.1; 705/7.26, 71
See application file for complete search history.

(56) References Cited

U.S. PATENT DOCUMENTS 8,296,380 B1 * 10/2012 Kelly ................ G06F 17/30528
703/23
2008/0049919 A1 * 2/2008 Pounds .............. G06Q 30/0251
379/201.04

FOREIGN PATENT DOCUMENTS

TW 573268 1/2004
TW I231681 4/2005
(Continued)

*Primary Examiner* — Dhaval Patel
(74) *Attorney, Agent, or Firm* — Muncy, Geissler, Olds & Lowe, P.C.

(57) ABSTRACT

A message transmission system and method for a structure of a plurality of organizations are disclosed, where the system includes: a database, a server, a push gateway, and a mobile communications device. The database, the server, and the push gateway are combined into a cloud of the present disclosure. A plurality of pieces of member information is stored in the database, each piece of member information includes at least one organization ID, an account, and a password, different organization IDs are unique to each other, and each organization ID may define an organization as a single-level organization or a multi-level organization. A client may access the cloud by using a single App and a single interface to receive or transmit messages.

14 Claims, 6 Drawing Sheets

(51) Int. Cl.
  *H04L 29/08* (2006.01)
  *G06Q 10/10* (2012.01)
  *H04W 12/06* (2009.01)
  *H04W 4/12* (2009.01)
  *H04M 1/725* (2006.01)
  *H04L 29/06* (2006.01)
  *G06F 17/30* (2006.01)

(56) References Cited

FOREIGN PATENT DOCUMENTS

| | | |
|---|---|---|
| TW | I359600 | 3/2012 |
| TW | 201312971 | 3/2013 |
| TW | 201346763 | 11/2013 |

* cited by examiner

MESSAGE TRANSMISSION SYSTEM AND METHOD FOR A STRUCTURE OF A PLURALITY OF ORGANIZATIONS

CROSS-REFERENCES TO RELATED APPLICATIONS

This application is a continuation-in-part (CIP) of application Ser. No. 14/456,143, filed on Aug. 11, 2014 with claiming foreign priority of TW103116325.

This application claims additional priority under 35 U.S.C. §119(a) on Patent Application No. 104104173 filed in Taiwan, R.O.C. on Feb. 6, 2015. The prior applications are herewith incorporated by reference in its entirety.

BACKGROUND

1. Technical Field

The present invention relates to a cloud technology applied to a mobile communications device, and more particularly, to a message transmission system and method for a structure of a plurality of organizations.

2. Related Art

Nowadays, there are a great number of systems that use a cloud technology on a mobile communications device to provide message exchange for associations or enterprise organizations; however, the prior art still has lots of deficiencies, making it impossible to meet operational demands of the associations or enterprise organizations for message exchange.

ROC Patent Application No. 092135402, entitled "AUTHENTICATION AND MESSAGE ENCRYPTION METHOD FOR PUSH TECHNOLOGY", discloses an authentication and message encryption method for a PUSH technology which uses an encrypted key technology for authentication and message encryption, where a PUSH initiator, a PUSH proxy gateway, and a PUSH client jointly participate in generation of a session key, that is, the three separately contribute random numbers generated by the three for use as parameters for generating the session key. Moreover, finally, only the PUSH initiator and the PUSH client separately generate a same shared encryption/decryption key, but the PUSH proxy gateway cannot generate the encryption/decryption key by itself, so as to improve security of the key, and reduce burden of the PUSH client for exponential operations. The technical problem actually solved by the first prior art is "regardless of a GSM or GPRS, its micro cellular systems do not have a mechanism ensuring that messages can be securely transmitted between a server and a user . . . when a private message is transmitted in a wireless network, it is possible that network operators intercept private data of the user, and this is undoubtedly a major threat to security and privacy of the user . . . " (see paragraph [0005] of the specification thereof). The technical effect produced by the first prior art is "allow various components in application environments of the PUSH technology to be capable of performing two-way authentication in pairs, so as to improve information security".

ROC Patent Application No. 100131952, entitled "METHOD FOR RECEIVING MESSAGE", discloses a method for receiving a message, which is applicable to an electronic device. The method includes: receiving a message; upon receipt of the message, establishing a connection to a server according to a network address built in an electronic device; obtaining a multimedia file from the server; and downloading and playing the multimedia file. The technical problem actually solved by the second prior art is "a short message presentation image is also very simple, and only displays content of a short message and provides simple operation functions such as short message editing. For users who often contact others by using a short message (text message), in addition to the focus on a prompt function, the user also thinks highly of a rich short message interface" (see paragraph [0002] of the specification thereof). The technical effect produced by the second prior art is "download a multimedia file through a message".

ROC Patent Application No. 091117503, entitled "CHANNEL SUBSCRIPTION AND PUSH SYSTEM AND METHOD", discloses a channel subscription and push system and method. A user is connected to a WML server by means of a mobile communications device, so as to subscribe to a channel. The WML server generates a subscription table and encodes the subscription table into SS DTD. An SQL server receives and stores the SS DTD, and determines whether information about the channel is updated according to the SS DTD. If yes, the SQL server sends an update message to a push server, and the push server receives the update message and pushes the update message to the mobile communications device. The mobile communications device receives the update message, and the user is connected to the WML server by means of the mobile communications device according to the update message, so as to download latest information. The technical problem actually solved by the third prior art is "1. The user must make an active query to find whether previously subscribed information is updated, resulting in that the user cannot know the latest information in real time. 2. Information received by the user is often not classified, organized or managed, so that it is quite a disorder for the user to read. 3. Generally, even if a mobile communications device obtains the subscribed information, without classification, organization, and management, it is impossible to implement a function of simultaneously subscribing to multiple pieces of information for the user" (see the final paragraph in [Background of the Invention] of the specification thereof). The technical effect produced by the third prior art is "once the information about the channel is updated, a user can be notified by using a push technology, so that the user can immediately learn the latest information. Moreover, information about channels received by the user is classified, organized, and managed, making it easy for the user to read".

ROC Patent Application No. 097100603, entitled "METHOD AND SYSTEM FOR CORRELATION OF MOBILE CHANNEL SUBSCRIPTION WITH DELIVERY CONTENT", discloses a method and system for establishing a delivery content for channel subscription in a mobile network, and the following steps are included: establishing a subscription between a mobile device in the mobile network and a content provider; and transferring a delivery content to a delivery server. The technical problem actually solved by the fourth prior art is " . . . Other alternatives include SMS based push and broadcast or community broadcast. In a case of broadcast, delivery cannot be customized to the needs of a particular user or the capabilities of a particular device. The systems therefore have no intelligence associated with them" (see paragraph [0005] of the specification thereof). The technical effect produced by the fourth prior art is "provide a subscription model and topology in which subscription information and a delivery content are both transferred to a delivery server or a content provider".

ROC Patent Application No. 101115678, entitled "SYSTEM AND METHOD FOR ESTABLISHING APPLICATION FOR MOBILE COMPUTING DEVICE", discloses a system and method for establishing an application for a mobile computing device, which enables a user to access an operating platform having a user interface by using a browser for establishing an application for a mobile computing device, including providing the user interface, which includes a combination of multilayered data setup pages and is configured to enable the user to be capable of customize displaying content of the application for a mobile computing device through a click selection operation. The technical problem actually solved by the fifth prior art is "a large amount of design and planning are required for make and complete an App from an idea, and therefore, for an ordinary user, it is not an easy task to write an App" (see paragraph [0003] of the specification thereof). The technical effect produced by the fifth prior art is "provide a convenient platform for establishing an application executable by a mobile computing device, and a user can easily complete data structure definition and layout setting thereof of the application (commonly known as an App) for the mobile computing device only through a click selection".

In the sixth prior art that, a software development manufacturer makes a customized message transmission system for a particular enterprise according to demands, where the system is arranged in a self-built equipment room of the enterprise or co-location (Internet Data Center), and a dedicated application (that is, an App) installed on a mobile communications device used by a member (that is, a person from the enterprise) is also developed in a customized manner for access to a server of the message transmission system. In terms of a deployment mode, the system in the sixth prior art is a private cloud deployment mode, and when n enterprises is deployed with such a private cloud, there must be n sets (one set refers to a mainstream platform including all mobile communications devices) of corresponding applications and n interfaces (because server IPs of respective private clouds are different, login interfaces thereof must be different). The technical problem actually solved by the sixth prior art is "deployment of a private cloud mode may allow enterprises to fully control system information security issues, and the dedicated application may avoid members to be interfered with by external persons", the so-called "the dedicated application may avoid members to be interfered with by external persons" means that the customized system must be accessed with the dedicated application, and only members of the organization have authorities to use it while relatives and friends of the members cannot transmit messages to them with other applications. The technical effect produced by the sixth prior art is "deploy a message transmission system in a private cloud mode, and use a dedicated application". In terms of a software development manufacturer, customized development and deployment of a message transmission system in a private cloud mode and application for an individual association or enterprise organization is quite time-consuming, laborious and costly, and it is also difficult to upgrade software in the future.

In the seventh prior art that, a mobile communications device and a push technology are used in a public cloud deployment mode to provide person-to-person message exchange services or message exchange services inside a single-level organization, for example, "Line" developed by the South Korean company NHN's subsidiary in Japan, Line Corporation, and "WeChat" application and its back-end systems developed by Tencent Inc in China. The biggest problem of the seventh prior art is that protection over privacy is not thorough enough. For example, a "Member A" and a "Member B" who know each other join such a system at the same time (it is assumed that they both join the same system "Line" or "WeChat" at the same time); however, for some reasons, the "Member A" is reluctant to let the "Member B" know that he uses the same application and system, so as to avoid being added to the friend list by the "Member B". However, the seventh prior art allows members in different organizations to search for a member in a database by using a mobile phone number or Email, that is, the "Member B" can easily find the "Member A" in the database of the system by using the mobile phone number or Email of the "Member A". In addition, the member account (that is, user ID) number used in the seventh prior art is unique, and no repetitive account exists even for members in different organizations and in different countries. The technical problem actually solved by the seventh prior art is "message content transmitted by the conventional SMS is not diversified enough, incapable of shortening the communication distance in a more vivid and lively manner". The technical effect produced by the seventh prior art is "deploy a message transmission system in a public cloud mode, provide person-to-person message exchange services or message exchange services inside a single-level organization, and make message images more vivid and lively".

The prior art in the foregoing does not solve problems such as "associations or enterprise organizations require a flexible multi-level structure", "a single cloud system is used to serve a large number of associations or enterprise organizations", "a single App and a single interface are used to access a single cloud system", "a single App and a single interface are used to access a hybrid cloud system", and "members in different organizations must be hidden from each other, and mobile phone numbers or Emails of members cannot be found by others outside an organization", and the technical means used and the technical effects produced are also irrelevant to "a message transmission system having a structure of a plurality of organizations". Therefore, it is indeed necessary to propose a mobile communications device cloud system suitable for associations and enterprise organizations to transmit messages and having a multi-level structure, to facilitate members under each association and enterprise organization use a single App and a single interface to directly access services.

SUMMARY

In view of this, the present invention proposes a message transmission system having a structure of a plurality of organizations and method, which allow a member to establish a connection to a single interface by using a single App to access a single cloud message transmission system having a structure of a plurality of organizations.

The present invention proposes a message transmission system having a structure of a plurality of organizations, including: a server-side database, a server, a push gateway, and a mobile communications device of a client. A plurality of pieces of member information is stored in the database, each piece of member information includes at least one organization ID, an account, and a password, different organization IDs are unique to each other, and each organization ID may define an organization as a single-level organization or a multi-level organization. The server includes: a first network communication module, a login authentication module, an account management module, an authority management module, and a bulletin board module. The first network communication module is used for establishing a network connection. The login authentication module receives an organization ID, an account, and a password uploaded via the network connection, and authenticates the organization ID, the account, and the password with the organization ID, the account, and the password stored in the database. The account management module is used for setting a level of the organization corresponding to the organization ID and addition, change, and deletion of the account in the database according to the uploaded organization ID. The authority management module is used for setting an authority of the level of the organization corresponding to the organization ID and an authority of the account in the database according to the uploaded organization ID. The bulletin board module receives an uploaded message, writes the message into the database, and generates a message-receiver list according to at least one receiver that is set by the message, the message-receiver list including at least one push ID. The push gateway generates a push notification according to partial or complete content of the message and the push ID on the message-receiver list, and sends the push notification through an external push host, the push notification including a push notification number. The mobile communications device is used for executing an application, the application including: a second network communication module, a login module, a data access module, a message input module, and a screen refreshing module. The second network communication module is used for establishing a network connection to the first network communication module of the server. The login module receives the input organization ID, account, and password, and uploads the organization ID, the account, and the password to the server by using the second network communication module. The data access module triggers the second network communication module to establish the network connection to the first network communication module of the server upon receipt of the push notification, and downloads the complete content of the message corresponding to the push notification number from the server. The message input module is used for inputting the message, and setting the at least one receiver. The screen refreshing module refreshes a screen of the mobile communications device according to the downloaded push notification or the message and displays the up-to-date information on the screen. The database, the server, and the push gateway are combined into a cloud, the first network communication module, the login authentication module, the account management module, the authority management module, and the bulletin board module belong to a serving module group, and a modularized and distributed design is used for the serving module group, which can be split and arranged (deployed) in different places.

The present invention proposes a message transmission method for a structure of a plurality of organizations, applied to a server, a database, a push gateway, a first mobile communications device, and a second mobile communications device, and including: storing a plurality of pieces of member information in the database, where each piece of member information includes at least one organization ID, an account, and a password, different organization IDs are unique to each other, and each organization ID may define an organization as a single-level organization or a multi-level organization; executing an application on the first mobile communications device; the application on the first mobile communications device establishing a network connection to the server of a public cloud; the application on the first mobile communications device uploading the organization ID, a first account, and a first password of a first member for login authentication; receiving an instruction corresponding to a serving module group, and performing redirection according to a serving-module-location-information; the application on the first mobile communications device receiving a message to be announced by the first member, and specifying at least one receiver; the application on the first mobile communications device establishing the network connection to the server, and uploading the message to a bulletin board module; the bulletin board module generating a message-receiver list according to the at least one receiver that is set by the message, the message-receiver list including at least one push ID; the server transmitting partial or complete content of the message and the message-receiver list to the push gateway; the push gateway generating a push notification according to the partial or complete content of the message and the push ID on the message-receiver list; sending the push notification through an external push host, the push notification including a unique push notification number; the second mobile communications device receiving the push notification; executing the application on the second network communication module; the application on the second mobile communications device establishing a network connection to the server of the public cloud; the application on the second mobile communications device uploading the organization ID, a second account, and a second password of a second member for login authentication, the second member and the first member belonging to the same organization; receiving the instruction corresponding to the serving module group, and performing redirection according to a serving-module-location-information; the application on the mobile communications device establishing the network connection to the server, and downloading the complete content of the message corresponding to the push notification number; and displaying the complete content of the message on a screen of the second mobile communications device.

The detailed features and advantages of the present invention are described below in detail through the following embodiments, the content of the detailed description is sufficient for persons skilled in the art to understand the technical content of the present invention and to implement the present invention accordingly. Based on the content of the specification, the claims, and the drawings, persons skilled in the art can easily understand the relevant objectives and advantages of the present invention.

DETAILED DESCRIPTION

Figure 1:
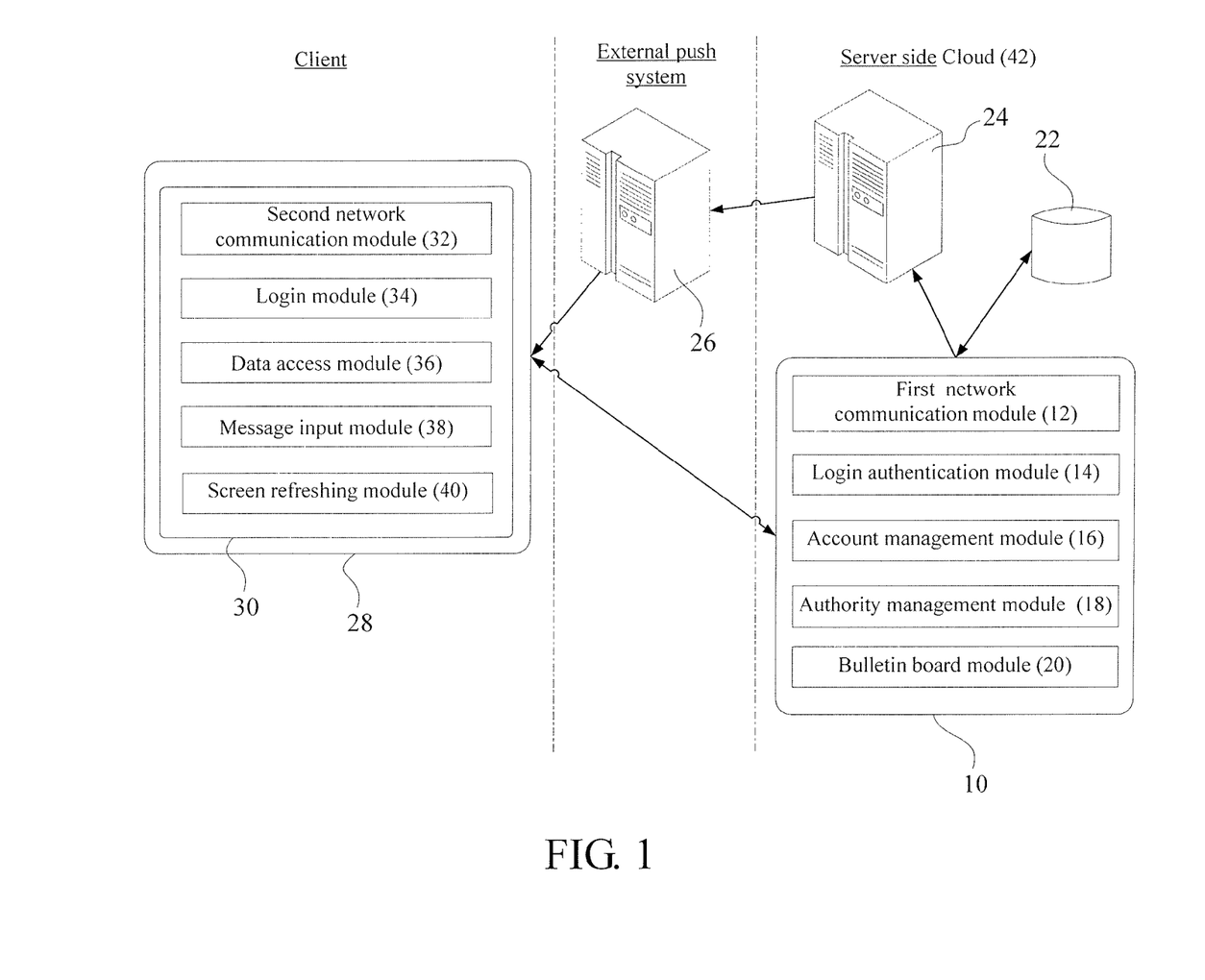
FIG. 1 is a system architecture diagram of a first embodiment of a message transmission system having a structure of a plurality of organizations according to the present invention.

FIG. 1 is a system architecture diagram of a first embodiment of a message transmission system having a structure of a plurality of organizations according to the present invention. The system includes: a server-side (that is, a cloud 42 of the present invention) database 22, a server 10, and a push gateway 24 as well as a mobile communications device 28 of a client. The database 22 defines a plurality of organizations, the so-called "organizations" are associations, groups or enterprises, and each organization is defined by a unique organization ID; in other words, for the system of the present invention, each newly set organization is provided with a unique organization ID by the system of the present invention. In terms of an embodiment of the present invention, the present invention uses a hierarchical namespace data structure to define an organization (sets an organization ID), once the organization ID is set, the organization is completely independent from outside (that is, a person outside the organization cannot search information inside the organization), even the organization name cannot be searched, and an external person cannot know exactly whether an organization exists in the system, achieving sufficient privacy for the origination, and the organization ID is a root namespace. The organization includes a single level or multiple levels and includes at least one member, which may be presented as organization information in the database 22. For example, an organization and an organization ID are mapped one by one and are stored in a table of the organization. In the database 22, member information based on members includes organization IDs of organizations where the members belong, accounts, and passwords. The so-called "level" refers to a structure in an organization; a single-level organization is, for example, a "pool club" or a "family", and because such an organization has a small number of members and it is not necessary to further divide the members into levels; a multi-level organization is, for example, a level under a company may be divided into four levels, that is, a "business group", a "department", a "section", and a "group" according to functional units, or may be divided into fifteen levels from "grade 1", "grade 2", . . . , and "grade 15" according to grades of members.

In the message transmission system of the present invention, a single member may join more than two organizations at the same time, and own organization IDs corresponding to the organizations. For example, a member joins a sports-loving society, a charity society, and an enterprise at the same time; therefore, the member owns three different organization IDs to correspond to the organizations respectively. Once the member joins an organization and member information of the member (the organization ID of the organization, and the account and the password of the member) is registered in the database 22 of the present invention, the member can enter a search system of the organization to find other members of the organization.

The server 10 includes the following serving modules (group): a first network communication module 12, a login authentication module 14, an account management module 16, an authority management module 18, and a bulletin board module 20. The first network communication module 12 is used for establishing a network connection of the TCP protocol (including socket and Websocket connections), the HTTP protocol or the HTTPS protocol to a second network communication module 32 of the mobile communications device 28 of the client. The login authentication module 14 receives an organization ID, an account, and a password uploaded by a member by using the mobile communications device 28, and then authenticates the organization ID, the account, and the password with the organization ID, the account, and the password corresponding to the member in the database 22. The account management module 16 sets a level of the organization corresponding to the organization ID and addition, change, and deletion of the account of the member in the database 22 according to the organization ID of the organization. The authority management module 18 sets an authority of the level of the organization corresponding to the organization ID and authorities of respective member accounts according to the organization ID input when an administrator having a setting authority logs in, and similarly, the administrator must log in to the database 22 using an organization ID of the administrator and an account and a password of the administrator. The bulletin board module 20 receives an uploaded message and writes the message into the database 22, so as to generate a message-receiver list (that is, "push IDs" of selected members) by performing a mapping work according to a receiver (that is, "a selected member in an organization address book") that is set by the message, and the message of such a type is a message delivered to the staff of an organization from top to down or a level in the organization, for example, an announcement message in a company. Content of the message may include: a text, an image, a video, audio, a file, among other types, and the so-called "receiver that is set" may be a specific member, a level of a specific organization, a specific group list or all members in an organization, the message-receiver list includes push IDs instead of mobile phone numbers, and one push ID corresponds to a receiving device (that is, the mobile communications device 28) of one member. The server 10 and the database 22 are not limited to being deployed on a specific number of devices, for example, they both may be deployed on a same device, or they both may be separately deployed on cluster-structured devices.

Figure 6:
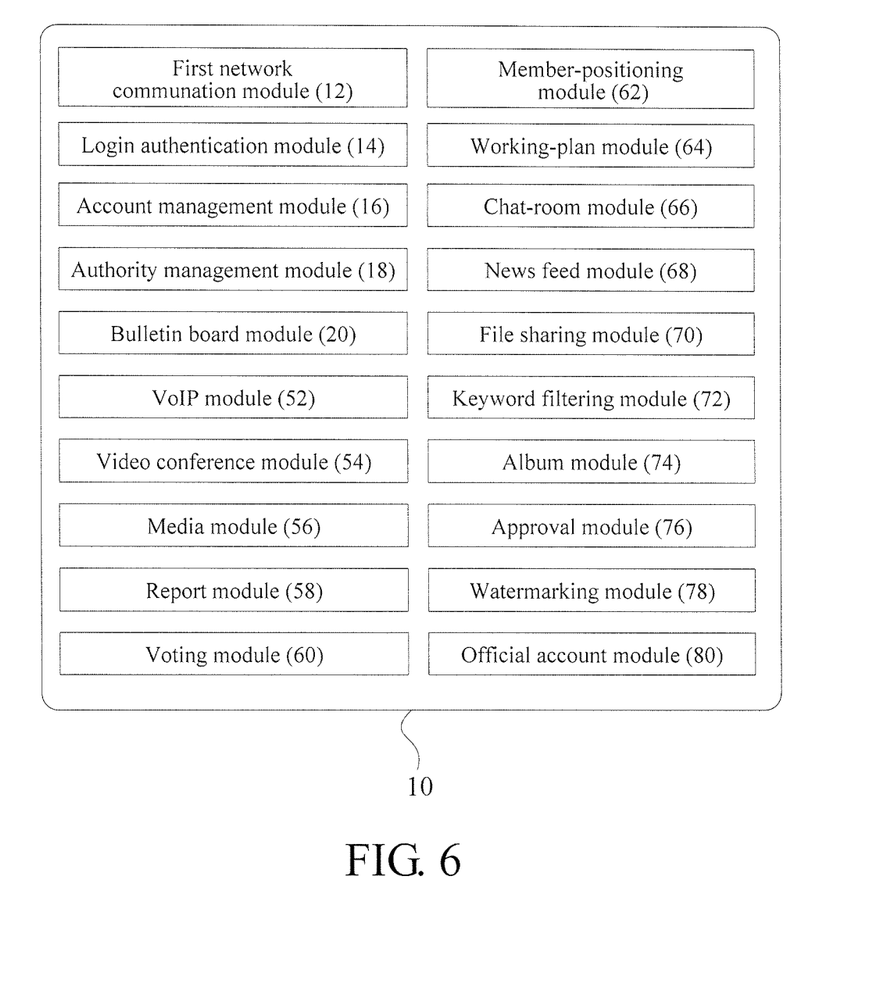
FIG. 6 is a schematic diagram of serving modules (group) according to another embodiment of the present invention.

In some embodiments, referring to FIG. 6, the serving modules (group) further include a VoIP (Voice over Internet Protocol) module 52 which provides a voice call function using a communication protocol of the VoIP, a video conference module 54 which provides a video conference call function using a communication protocol (e.g. SIP or H.323), a media module 56 which provides a playing and controlling function for an audio or a video, a report module 58 which issues, reads and manages a message for "problem notice" or "warning notice", a voting module 60 which provides an electronic balloting and surveying function, a member-positioning module 62 which provides a position-feedback function for returning a geographic location information of the member, a working-plan module 64 provides a "to-do lists" or "work-assignment" function, a chat-room module 66 provides a real-time chatting function for one-to-one chat room or many-to-many group chat room, a news feed module 68 which issues, displays and manages news feed, a file sharing module 70 which provides a file-sharing function supporting various file formats, a keyword filtering module 72 which provides setting, warning or intercepting functions for a particular keyword, an album module 74 which provides an album function for auto-integrating photographs in the news feed or the chat room, an approval module 76 which provides an approval function of a hierarchical form, a watermarking module 78 which adds a watermarking to a particular file according to the news feed of different user, an official account module 80 which provides the enterprise official accounts to issue official news, etc. In an embodiment, the serving modules enabled for the members to access in each organization are managed in parameters configuring manner. Different organization can have different parameters configurations for enabling a part of the serving modules or all of them to the members. That is, the enabled serving module accessed by the members in each organization depends on an "access-module-parameter-configuration" related to each organization in the cloud 42. The access-module-parameter-configuration is stored in the server 10 or the database 22. For example, an "Organization A" is the highest level of paid enterprise, and thus the parameters of the "Organization A" in the access-module-parameter-configuration represent the members in the "Organization A" can access all serving modules. An "Organization B" is the second level of paid enterprise, and thus the parameters of the "Organization B" in the access-module-parameter-configuration represent the members in the "Organization B" can access a majority of serving modules. An "Organization C" is the free trial account and thus the parameters of the "Organization C" in the access-module-parameter-configuration represent the members in the "Organization C" can only access the fundamental serving modules. The access-module-parameter-configuration details and lists all enabled serving modules.

The push gateway 24 generates a push notification according to the partial or complete content of the message and the push ID on the message-receiver list, and sends the push notification through an external push host 26 (for example, MPNS, GCM and APNS). The push notification includes a unique push notification number (or at least being unique inside a searchable query range of recent data). The so-called "partial or complete content of the message" of the push notification depends on the length of the content of the message. By using APNS as an example for description, the allowable maximum length of the content (payload) of the message is 256 Bytes. When content of a message is less than 256 Bytes, a push notification of the message includes complete content of the message; when content of a message is more than 256 Bytes, a push notification of the message only includes partial content of the message (that is, the part of first 256 Bytes).

The mobile communications device 28 (for example, a smart phone or tablet computer on which an iOS, Android or Windows Phone operating system runs) executes an application 30 (also known as an App). The application 30 includes: a second network communication module 32, a login module 34, a data access module 36, a message input module 38, and a screen refreshing module 40. The second network communication module 32 is used for establishing a network connection of the TCP protocol, the HTTP protocol or the HTTPS protocol to the first network communication module 12 of the server 10. The login module 34 receives an organization ID, an account, and a password of a user (that is, a member), and uploads the organization ID, the account, and the password to the server 10. The data access module 36 triggers the second network communication module 32 to establish the network connection (TCP protocol, HTTP protocol or HTTPS protocol) to the first network communication module 12 of the server 10 upon receipt of the push notification, and downloads the complete content of the message corresponding to the push notification number from the server 10. According to an embodiment of the present invention, the network connection established by the second network communication module 32 to the first network communication module 12 uses the TCP protocol or the Websocket protocol (which belongs to the TCP protocol, but a handshake request sent by the client is in an HTTP form), and the data access module 36 in this embodiment directly downloads the message. According to another embodiment of the present invention, the network connection established by the second network communication module 32 to the first network communication module 12 uses the HTTP protocol or the HTTPS protocol, and the data access module 36 in this embodiment downloads the message by using a polling technology. The message input module 38 is used for inputting a message to be transmitted, and setting at least one receiver; a method for setting the receiver is selecting a specific member, a level of a specific organization, a specific group list or all members in the organization from an organization address book. The so-called "organization address book" is edited by an administrator having an authority (for example, a MIS person), while other members only can view or use but cannot edit the organization address book. The so-called "specific group list" is also edited by an administrator having an authority, for example, "a first-level director of all units/levels in an organization", "a second-level director of all units/levels in the organization", "a basic-level person of all units/levels in the organization", . . . , and the like. Receivers of such a type are originally distributed into all units/levels, and therefore it is necessary to manually make them into a specific group list for use. The screen refreshing module 40 refreshes a screen of the mobile communications device 28 according to the downloaded push notification or message and displays the up-to-date information on the screen.

It is described is foregoing that a same member may join many different organizations at the same time and own organization IDs of the organizations. It is assumed that a member has joined three different organizations, and three accounts have all been authenticated (one step in an account registration process, for example, authentication using an Email or authentication using a mobile phone number); after the member logs in, all notification messages of the three organizations can be received in the same application 30. If the member no longer wants to receive notification messages from one organization, the member can turn off notifications from the organization in "setting" of the organization, or directly logs out from the organization.

Figure 2:
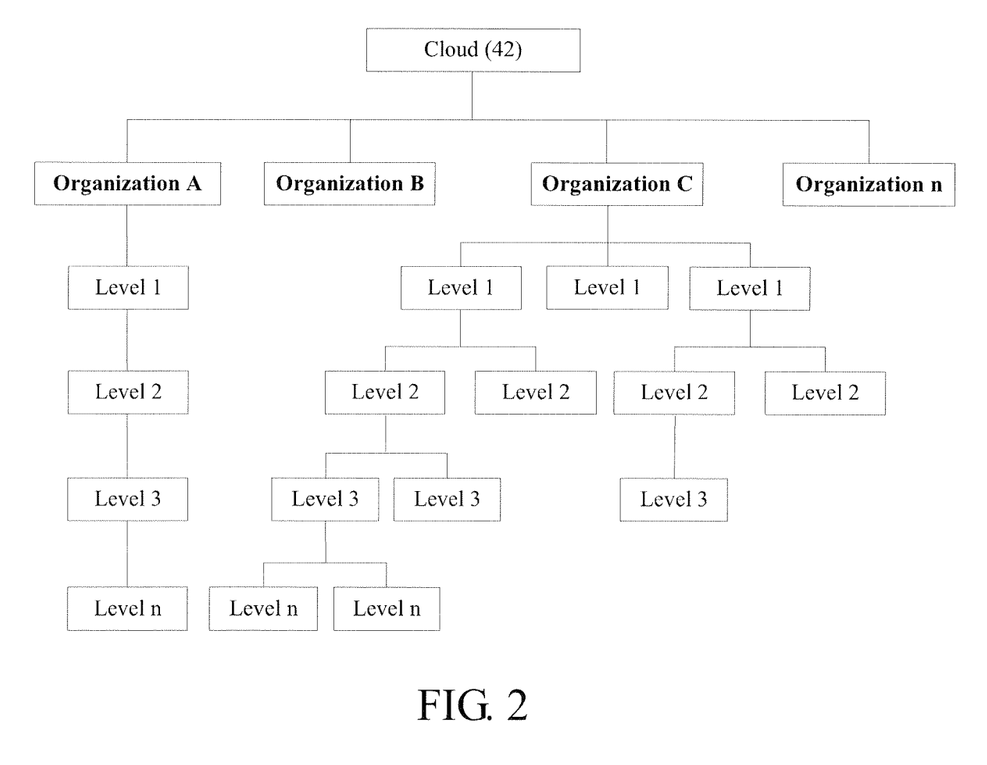
FIG. 2 is a schematic diagram of organizations and levels of a cloud according to an embodiment of the present invention.

FIG. 2 is a schematic diagram of organizations and levels of a cloud 42 according to a preferred embodiment of the present invention, in which it is described that the structure of the cloud 42 of the present invention has and supports a plurality of organizations, each organization may include a single level or multiple levels, and there are zero to a plurality of members under a level (not marked in FIG. 2). A level structure of an "Organization A" in FIG. 2 is vertical (or called a high-building type, a high-tower type), and is suitable for an organization in which a grade of a member is used to distinguish a level. For example, the first level is "grade 15", the second level is "grade 14", the third level is "grade 13", . . . , and so on, and "members in grade 13 or above are executives". The bulletin board module 20 of the present invention can specify a delivery level of an announcement message, for example, delivered to all executives in the organization, that is, the first level to the third level are included. A level structure of an "Organization B" in FIG. 2 only has a single level, and is suitable for an organization that has a small number of members or uses a flat structure, for example, families, school societies, small companies, small groups bound by common interests, . . . , and so on. A level structure of an "Organization C" in FIG. 2 has a pyramid type, and is suitable for various medium and large enterprises and teams. The organization structure in which a plurality of levels can be set flexibly is one of the main technical features of the present invention.

In an organization having a plurality of levels (for example, the "Organization A" and the "Organization C"), each level has an administrator having a setting authority, and in an enterprise organization, the top-level general administrator is a MIS person of the company, while administrators at all levels are heads of units (for example, a business group manager, department head, section chief, leader, . . . , and so on). The authority of the administrator is generally granted when a new organization and a new account of the administrator is added, or may also be granted after a new account is added. The present invention uses a Namespace data structure technology to set organization IDs, all data of organizations is completely independent from outside, and even if accounts (that is, accounts of members) under each organization use the same code (for example, employee numbers "0001", "0002", "0003", . . . , and so on), a conflict problem of identical accounts does not exist; therefore, it is more flexible when each organization sets account codes for members under the organization without needing to worry about the problem that the same account has been occupied by members in other organizations. In addition, even if a number of different organizations use mobile phone numbers or Emails of members as accounts (or filled in "contact information"), interferences from an external person are avoided as long as in one organization, mobile phone numbers or Emails of members under other organizations cannot be searched. Inside an organization, all members in the organization can be searched by using mobile phone numbers, Emails or keywords, and search inside an organization belongs to the prior art, which therefore is not repeated herein. Different organizations are separated by using organization IDs and namespace data structures, so that an external person cannot search members inside the organizations, which is another main technical feature of the present invention. In other words, in the architecture of the present invention, identification of each "member" is based on a combination of an organization identifier (an organization identity, organization ID) and a member account (a member identity, member ID), which is a double-layer ID structure, which is different from a single-layer ID (single-account) structure in the past. The prior art only uses a single-layer ID structure for identification, and therefore each ID must be unique. The present invention performs identification (login authentication) in a manner of double IDs of an organization ID and a member account, the first-layer ID has a search concealment function (organizational independence), and the second-layer ID has an identification function inside an organization. Therefore, member accounts of different members in different organizations may be same without conflicting with each other.

Figure 3:
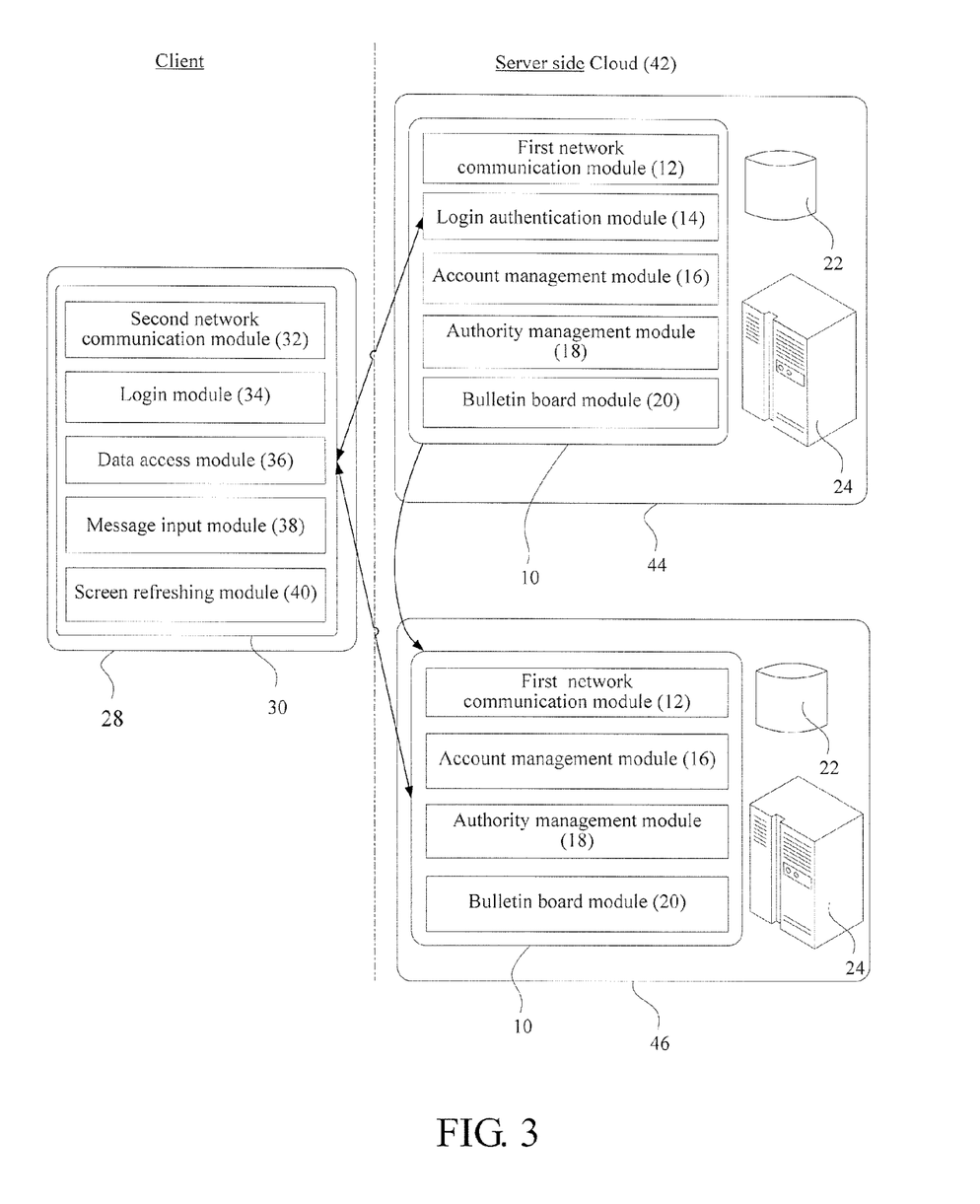
FIG. 3 is a schematic diagram of a deployment mode of a cloud according to an embodiment of the present invention.

FIG. 3 is a schematic diagram of a deployment mode of a cloud 42 according to an embodiment of the present invention, in which it is described that the cloud 42 of the present invention provides two deployment modes: a public cloud mode and a hybrid cloud mode. The public cloud mode means that a server 10, a database 22, and a push gateway 24 on a server side are all provided by a service provider; it is assumed that an "Organization A" is an ordinary company or association which has no particularly stringent requirements for management and control over information security, a serving module group (that is, a first network communication module 12, a login authentication module 14, an account management module 16, . . . , and so on) and devices to which the organization A accesses are arranged in a public cloud 44, that is, records of messages sent by the organization A are also kept in the database 22 of the public cloud 44 and are maintained by the service provider. The hybrid cloud mode means that a part of serving modules and devices are arranged in the public cloud 44; meanwhile, the other part of the serving module and devices are arranged in a private cloud 46, and an arrangement position of each serving module is stored to "the serving-module-location-information", in which the serving module group arranged in the private cloud 46 and the IP address thereof are recorded. It is assumed that an "Organization C" is a financial enterprise which is very strict on management and control over information security, all serving modules relevant to personal information and records of sent messages must be set and kept in a self-built equipment room. Therefore, except that the login authentication module 14 (that is, a login interface) of the present invention is still arranged in the public cloud 44, other devices and serving modules are arranged in the private cloud 46 (that is, the self-built equipment room of the "Organization C") and recorded in the serving-module-location-information. When a member of the "Organization C" accesses the cloud 42 of the present invention by using the application 30 of the present invention, first, the login interface is still in the public cloud 44 (that is, the login authentication module 14), and upon completion of login authentication, when the application 30 receives an instruction corresponding to the serving module group, the system performs redirection according to locations of serving modules (serving-module-location-information). For example, a user selects a bulletin board function in the application 30, that is, correspondingly turns to the bulletin board module 20; in this case, the system performs redirection according to "an IP address of the bulletin board module 20 arranged in the private cloud 46" recorded in the serving-module-location-information; next, the application 30 directly accesses the bulletin board module 20 of the server of the private cloud 46, and sensitive data (for example, records of sent messages) of the "Organization C" can therefore be completely kept in the database 22 of the private cloud 46. As a modularized and distributed design is used for the serving module group of the present invention, the serving module group can be arbitrarily split or arranged in different places (that is, the public cloud 44 and the private cloud 46) according to demands of enterprise customers, which is a further main technical feature of the present invention. When the serving module group is split and arranged in the public cloud 44 and the private cloud 46, while the login authentication module 14 is still arranged in the public cloud 44, and redirection is performed by using "the serving-module-location-information"; such a deployment mode is the hybrid cloud mode of the present invention.

The deployment of the hybrid cloud mode has some customized operations (that is, split and arrangement of serving modules) due to demands of enterprise customers, but is different from the sixth prior art in that the client does not need to access the private cloud 46 by using a conventional dedicated application, and instead, in the hybrid cloud mode of the present invention, the private cloud 46 is accessed by using the same application 30, the reason for which has been stated above, that is, the login interface is still in the public cloud 44 (that is, the login authentication module 14). In other words, a service provider no longer needs to customize dedicated applications for different enterprise customers, and serving all enterprise customers by using a single application 30 can significantly save the time required to release an App, simplify the process, and save manual labor (for example, a stringent review process is required for release in AppStore of Apple). Such a mode of accessing a public cloud and a hybrid cloud by using a single interface and a single application (that is, an App) is another main technical feature of the present invention.

In another embodiment, before performing the redirection to the private cloud 46, an authenticating step by using a digital certificate (an electric certificate) to check the identity of the private cloud 46 and avoid a malicious fake server stealing data. In this embodiment, when setting the private cloud 46 (i.e. registering the private cloud 46 in the public cloud 44) in the first place, the administrator of the private cloud 46 needs to input the stored path of the digital certificate in the private cloud 46 that is issued by the certificate authority (CA), and then the certificate authentication center performs the verification of certification for the digital certificate. "The digital certificate is applied from the CA" and "the verification of certification is performed by using API of the certificate authentication center" both belong to the prior art, and therefore are not explained herein. After the verification of certification has succeeded, the IP address of the private cloud 46 and the digital certificate thereof are recorded into the serving-module-location-information. After the mobile communications device 28 of a certain user performs the login authentication and before the redirection is performed to the private cloud 46, the login authentication module 14 of the public cloud 44 performs login authentication based on the IP address and the digital certificate recorded in the serving-module-location-information. In the embodiment, the token technology is applied. During the token is valid (e.g. within 24 hours after first performing the login authentication), the token is used directly instead of the authenticating step.

Figure 4:
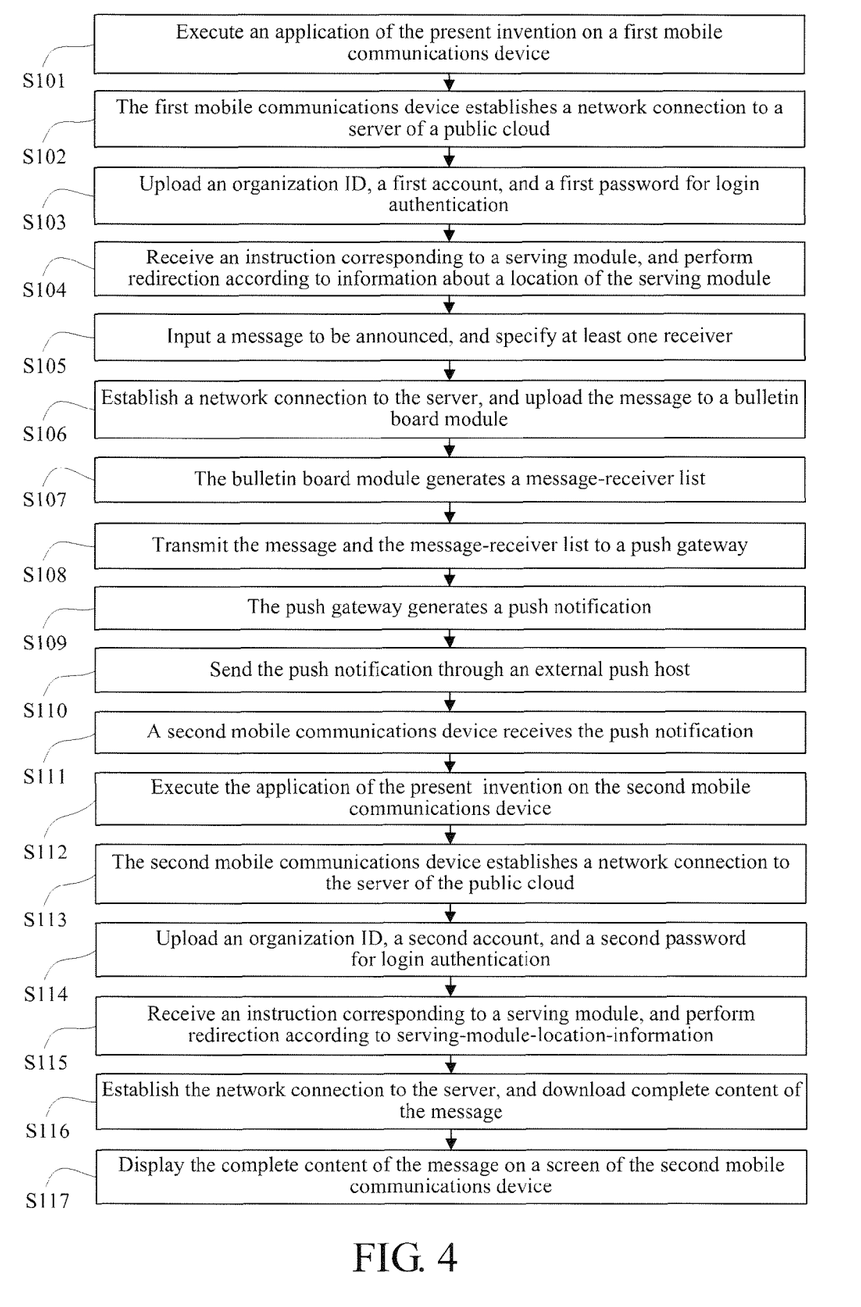
FIG. 4 is a flowchart of operations according to the first embodiment of the present invention.

FIG. 4 is a flowchart of operations according to the first embodiment of the present invention. For the process in which a first mobile communications device uploads an announcement message to a server 10 and finally displays the message on a second mobile communications device, reference may be made to FIG. 1, FIG. 2, and FIG. 3, and the process includes the following steps:

Step S101: Execute an application 30 of the present invention on the first mobile communications device. The first mobile communications device is a mobile communications device 28 of the present invention, for example, a smart phone iPhone5S from Apple, and it is assumed that a user of the first mobile communications device is a first member of an "Organization A".

Step S102: The first mobile communications device establishes a network connection to the server 10 of a public cloud 44. After the application 30 is executed, a second network communication module 32 of the application 30 establishes a network connection of the TCP protocol (including socket and websocket connections), the HTTP protocol or the HTTPS (that is, HTTP over SSL) protocol to the first network communication module 12 of the server 10 of the public cloud 44.

Step S103: Upload an organization ID, a first account, and a first password for login authentication. The first member uses the application 30 of the first mobile communications device to input the organization ID, the first account, and the first password, where the organization ID represents the "Organization A" to which the first member belongs. Next, the first mobile communications device uploads the organization ID, the first account, and the first password to the server 10 of the public cloud 44, and the login authentication module 14 of the public cloud 44 performs login authentication.

Step S104: Receive an instruction corresponding to a serving module, and perform redirection according to the serving-module-location-information. When the application 30 of the first mobile communications device receives an instruction corresponding to a serving module, the system performs redirection on the application 30 of the first mobile communications device according to the serving-module-location-information stored in the public cloud 44. For example, the first member selects a bulletin board function (the serving module corresponding to the selection instruction is a bulletin board module 20) in the application 30; in this case, the system performs redirection on the application 30 according to "an IP address of the bulletin board module 20 arranged in a private cloud 46" recorded in the serving-module-location-information, and then the application 30 directly accesses the bulletin board module 20 of the server 10 of the private cloud 46.

Step S105: Input a message to be announced, and specify at least one receiver. The first member uses a message input module 38 of the application 30 of the first mobile communications device to input a message to be announced, and specify at least one receiver to which the message is announced, where a method for specifying the receiver is selecting a specific member, a level of a specific organization, a specific group list or information about all members of the organization from an organization address book. In this example, it is assumed that a receiver selected by the first member from the organization address book includes a second member.

Step S106: Establish a network connection to the server 10, and upload the message. When the network connection established by the second network communication module 32 to the first network communication module 12 in Step S102 uses the TCP protocol, in this step, the message can be directly uploaded to the bulletin board module 20. When the network connection established in Step S102 uses the HTTP protocol or the HTTPS protocol, in this step, the second network communication module 32 first needs to reestablish a network connection of the HTTP protocol or the HTTPS protocol to the first network communication module 12, and then upload the message to the bulletin board module 20.

Step S107: The server 10 generates a message-receiver list. The bulletin board module 20 of the server 10 generates a message-receiver list according to the receiver that is set by the message, where the message-receiver list includes push IDs, and the message-receiver list at least includes one push ID.

Step S108: The server 10 transmits partial or complete content of the message and the message-receiver list to the push gateway 24.

Step S109: The push gateway 24 generates a push notification. The push gateway 24 generates the push notification according to the partial or complete content of the message and the push ID on the message-receiver list.

Step S110: Send the push notification through the external push host 26, where the push notification includes a unique push notification number, and the external push host 26 is, for example, MPNS, GCM or APNS.

Step S111: The second mobile communications device receives the push notification. The second mobile communications device is the mobile communications device 28 of the present invention, for example, a smart phone HTC One X, and it is assumed that a user of the second mobile communications device is the second member of the "Organization A".

Step S112: Execute an application 30 of the present invention on the second mobile communications device.

Step S113: The second mobile communications device establishes a network connection to the server 10 of the public cloud 44. After the application 30 is executed, the second network communication module 32 of the application 30 establishes a network connection of the TCP protocol, the HTTP protocol or the HTTPS protocol to the first network communication module 12 of the server 10 of the public cloud 44.

Step S114: Upload an organization ID, a second account, and a second password for login authentication. The second member uses the application 30 of the second mobile communications device to input an organization ID, a second account, and a second password, where the organization ID represents the "Organization A" to which the second member belongs, and then uploads the organization ID, the second account, and the second password to the server 10 of the public cloud 44, and the login authentication module 14 of the public cloud 44 performs login authentication.

Step S115: Receive an instruction corresponding to a serving module, and perform redirection according to the serving-module-location-information. When the application 30 of the second mobile communications device receives an instruction corresponding to a serving module, the system performs redirection on the application 30 of the second mobile communications device according to the serving-module-location-information stored in the public cloud 44.

Step S116: Establish the network connection to the server 10, and download the complete content of the message. When the network connection established by the second network communication module 32 to the first network communication module 12 in Step S113 uses the TCP protocol, in this step, the complete content of the message corresponding to the push notification number can be directly downloaded. When the network connection established in Step S113 uses the HTTP protocol or the HTTPS protocol, in this step, the second network communication module 32 needs to first reestablish a network connection of the HTTP protocol or HTTPS protocol to the first network communication module 12, and then download the complete content of the message corresponding to the push notification number.

Step S117: The screen refreshing module 40 displays the complete content of the message on a screen of the second mobile communications device.

Figure 5:
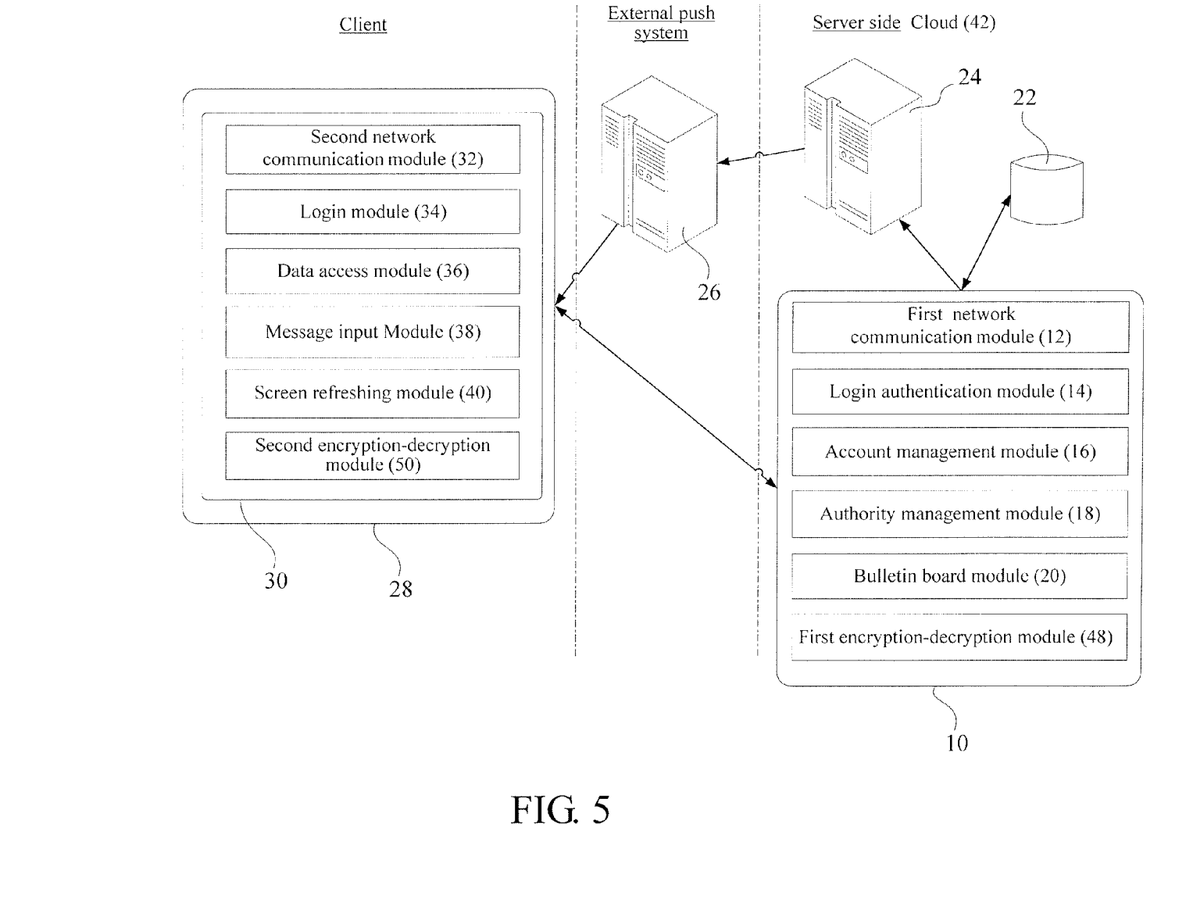
FIG. 5 is a system architecture diagram of a second embodiment of a message transmission system having a structure of a plurality of organizations according to the present invention.

FIG. 5 is a system architecture diagram of a second embodiment of a message transmission system having a structure of a plurality of organizations according to the present invention, and the second embodiment is different from the first embodiment in that in the present invention, a first encryption-decryption module 48 is added in a server 10 and a second encryption-decryption module 50 is added in a mobile communications device 28. The first encryption-decryption module 48 and the second encryption-decryption module 50 of the present invention use a symmetric (symmetric key), asymmetric (asymmetric key) or Hash encryption/decryption schemes to encrypt a message transmitted between the server 10 and the mobile communications device 28 (that is, the network connection established between a first network communication module 12 and a second network communication module 32), and perform decryption upon receipt of the message. The symmetric encryption/decryption algorithm used in the present invention is selected from: the Data Encryption Standard (DES), Triple DES, International Data Encryption Algorithm (IDEA), RC, Blowfish, and Advanced Encryption Standard (AES). The asymmetric encryption/decryption algorithm is selected from: the RSA, knapsack code, and Elliptic Curve. The Hash algorithm is selected from: the Message Digest (MD, for example, MD4 or MD5), Secure Hash Algorithm (SHA), SHA-1, and RIP-EMD-160. The encryption/decryption scheme in the first prior art is merely applied to a transmission channel between a push initiator 1, a push proxy gateway 2, and a push client 3 (see paragraphs [0012] and [0013] of the specification thereof and FIG. 1), where the transmission channel corresponds to the transmission channel from a push gateway 24 to the mobile communications device 28 through an external push host 26 in FIG. 5 of the present invention. However, the encryption/decryption scheme of the first encryption-decryption module 48 and the second encryption-decryption module 50 of the present invention further includes a transmission channel directly established between the server 10 and the mobile communications device 28 (that is, the first network communication module 12 and the second network communication module 32). In other words, the present invention not only encrypts the push notification (from the push gateway 24 to the mobile communications device 28 through the external push host 26), but also encrypts the message downloaded by the data access module 36 from the server 10 during transmission, which is another technical feature of the present invention.

The operation flow of the second embodiment is substantially identical with that in FIG. 4 of the first embodiment, except that data encryption is performed before transmission of Step S103, Step S106, Step S110, Step S111, Step S114, and Step S116, and data decryption is performed after transmission.

In sum, a message transmission system and method for a structure of a plurality of organizations according to the present invention solve the technical problems in the prior art, so that an organization may have a flexible multi-level structure, use a mode of accessing a public cloud and a hybrid cloud by using a single App and a single interface, and use a single cloud system to serve a large number of organizations, and privacy of members of the organizations is protected to avoid search by an external person.

In another embodiment, the present invention proposes a front-end editor for a member having an authority in the organization to set organization information (for example, contact information of the organization) and levels (for example, the number of levels, names of the levels) of the organization corresponding to the organization ID and addition, change, and deletion of member accounts in the database 22, and set an authority of a level of the organization corresponding to the organization ID and an authority of an account of a member in the database 22. The so-called front-end includes a web application and an application, in which the latter includes an application executed on a personal computer and an application executed on a mobile communications device 28. The front-end editor of the web application performs operations by using a web browser. The front-end editor of the present invention mainly provides a graphical user interface (GUI) provided with account and authority settings, which accesses an account management module 16 and an authority management module 18 on a server side through an application programming interface (API). For example, a member having an authority can directly edit, on a mobile phone by using a front-end editor, the number of levels of an organization, an execution authority of a level, an execution authority of an account, . . . , and perform other relevant settings.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A message transmission method for a structure of a plurality of organizations, applied to a cloud, a first mobile communications device and a second mobile communications device, the cloud comprising: a server, a database, and a push gateway, a deployment mode of the cloud is a hybrid cloud mode, and the method comprising:
 storing a plurality of pieces of member information in the database, wherein each piece of member information comprises at least one organization ID, an account, and a password, different organization IDs are unique to each other, each organization ID may define an organization as a single-level organization or a multi-level organization and serve as a root namespace, and the database defines the organization ID by using a namespace data structure, so as to make the organization ID completely independent and invisible from outside;
 executing an application on the first mobile communications device;

the application on the first mobile communications device establishing a network connection to the server of a public cloud;
the application on the first mobile communications device uploading an organization ID, a first account, and a first password of a first member to the server of the public cloud for a login authentication module to perform login authentication;
receiving an instruction corresponding to a serving module group, and performing redirection to the serving module group according to a serving-module-location-information, wherein in the hybrid cloud mode, the serving module group is split and arranged into the public cloud and a private cloud, the login authentication module is arranged in the public cloud, and when the application receives the instruction corresponding to the serving module group, redirection is performed according to the serving-module-location-information and the application directly accesses the serving module group;
the application on the first mobile communications device receiving a message to be announced by the first member, and specifying at least one receiver;
the application on the first mobile communications device establishing the network connection to the server, and uploading the message to a bulletin board module;
the bulletin board module generating a message-receiver list according to the at least one receiver that is set by the message, the message-receiver list comprising at least one push ID;
the server transmitting partial or complete content of the message and the message-receiver list to the push gateway;
the push gateway generating a push notification according to the partial or complete content of the message and the push ID on the message-receiver list;
sending the push notification through an external push host, the push notification comprising a unique push notification number;
the second mobile communications device receiving the push notification;
executing the application on the second network communication module;
the application on the second mobile communications device establishing a network connection to the server of the public cloud;
the application on the second mobile communications device uploading the organization ID, a second account, and a second password of a second member to the server of the public cloud for login authentication;
receiving the instruction corresponding to the serving module group, and performing redirection to the serving module group according to the serving-module-location-information;
the application on the mobile communications device establishing the network connection to the server, and downloading the complete content of the message corresponding to the push notification number; and
displaying the complete content of the message on a screen of the second mobile communications device.

2. The message transmission method for a structure of a plurality of organizations according to claim 1, wherein a method for specifying the at least one receiver is selecting specific member information, a level of a specific organization, a specific group list or all the member information having a same organization ID from an organization address book.

3. The message transmission method for a structure of a plurality of organizations according to claim 2, wherein the organization address book is edited by an administrator having an authority.

4. The message transmission method for a structure of a plurality of organizations according to claim 2, wherein the specific group list is edited by an administrator having an authority.

5. The message transmission method for a structure of a plurality of organizations according to claim 1, wherein the private cloud stores a digital certificate and the login authentication module performs a verification of the digital certificate before the redirection is performed according to the serving-module-location-information.

6. The message transmission method for a structure of a plurality of organizations according to claim 1, wherein the serving module group is the login authentication module, the bulletin board module and at least one selected from the group consisting of: an account management module, an authority management module, a VoIP module, a video conference module, a media module, a report module, a voting module, a member-positioning module, a working-plan module, a chatroom module, a news feed module, a file sharing module, a keyword filtering module, an album module, an approval module, a watermarking module, an official account module and any combination thereof.

7. The message transmission method for a structure of a plurality of organizations according to claim 6, wherein the serving module group is a modularized and distributed design and is split and arranged in different places.

8. The message transmission method for a structure of a plurality of organizations according to claim 6, wherein the cloud stores an access-module-parameter-configuration related to each of the at least one organization, and the access-module-parameter-configuration lists all enabled serving modules related to the organization.

9. The message transmission method for a structure of a plurality of organizations according to claim 1, wherein a structure of the multi-level organization is a vertical level structure or a pyramid-shaped level structure.

10. The message transmission method for a structure of a plurality of organizations according to claim 1, wherein a content type of the message is a text, an image, a video, audio or a file.

11. The message transmission method for a structure of a plurality of organizations according to claim 1, wherein for the message and the push notification, the message and the content of the message of the push notification are encrypted by using an encryption scheme before transmission, and after transmission, the received message and the content of the message of the push notification are decrypted by using a decryption scheme.

12. The message transmission method for a structure of a plurality of organizations according to claim 11, wherein the encryption scheme and the decryption scheme are using a symmetric encryption/decryption scheme, an asymmetric encryption/decryption scheme or a Hash encryption/decryption scheme.

13. The message transmission method for a structure of a plurality of organizations according to claim 6, further comprising:
using a front-end editor to provide a graphical user interface for access to the account management module and the authority management module.

14. The message transmission method for a structure of a plurality of organizations according to claim 13, wherein the front-end editor is a web application, an application on a personal computer or an application on the first mobile communications device or the second mobile communications device.

* * * * *